Sept. 15, 1964    J. H. WALKUP ETAL    3,149,049
CONTINUOUS STARCH ENZYMATIC CONVERSION PROCESS
Filed May 21, 1962    2 Sheets-Sheet 1

INVENTORS
John H. Walkup
John G. Leech
BY
AGENT

INVENTORS
John H. Walkup
John G. Leech
BY Richard L. Schmalz
AGENT

3,149,049
CONTINUOUS STARCH ENZYMATIC CONVERSION PROCESS

John H. Walkup, Danville, Ky., and John G. Leech, Roselle Park, N.J., assignors to West Virginia Pulp and Paper Company, New York, N.Y., a corporation of Delaware
Filed May 21, 1962, Ser. No. 196,280
12 Claims. (Cl. 195—31)

This invention relates to a process of converting starch, and more particularly to a continuous process of converting starch by an enzyme conversion-heat deactivation stage followed by an enzyme conversion-chemical deactivation stage. The products produced by this novel process find great utility in the papermaking industry, especially in paper coating and sizing compositions.

Frequently, starch is purchased as raw or pearl starch, and is converted in a batch process by the user at the site of its use. After conversion, the starch is commonly stored for a peirod of several hours before it is utilized in paper sizing and coating compositions. It has been an objective of the industry to provide a practical continuous starch conversion process, and also to provide a converted starch with a viscosity stability such that the starch may be stored at elevated temperatures for several hours before use. According to the present process, these objectives are achieved.

The purpose of conversion is to degrade starch, water dispersions of which are highly viscous at low solids, in order to modify or reduce its native viscosity characteristics before its end use, which in the papermaking field may be as an adhesive in a paper coating composition. In general, starch may be modified by: (1) treatment with an acid such as hydrochloric or sulfuric acid; (2) treatment with a hypochlorite solution to oxidize the starch; and (3) treatment with enzymes. This invention relates to the latter treatment and combines in one continuous process the advantageous features of several enzymatic treatments.

One continuous starch conversion process investigated has been to treat a starch slurry with enzyme, heat the mixture to conversion temperature, which is above the temperature where most of the starch gels, and hold for some time at this temperature to effect a major viscosity reduction. The enzyme was then arrested by the use of chemical inactivators. It was found to be possible to predict the rate of enzyme addition necessary to produce a converted starch product having the desired final viscosity characteristics. However, because the converted starch is frequently stored at elevated temperatures before its use in coating compositions and the like, the viscosity of the starch continues to reduce for extensive periods of time following the addition of the chemical deactivators. This continued viscosity reduction has been attributed to the action of heat and stirring during storage, and is a major problem when dealing with the storage of converted starch.

After much experimentation, we have found that if the above process is preceded by a partial starch conversion step, utilizing heat to deactivate the enzyme, a converted starch product with surprising viscosity stability at elevated temperatures can be produced. Converted starch products may be prepared which have a wide range of final viscosities, but more particularly it is possible to prepare starch products, having Brookfield viscosities at 20 r.p.m. as low as 80–100 centipoises at 170° F., which can hold their viscosities for six or more hours with a viscosity variation of only in the order of ±10 centipoises.

The partial conversion step mentioned above is accomplished by heating a starch slurry and enzyme to conversion temperature to effect a major viscosity reduction, and then the enzyme is arrested by rapidly raising the temperature and holding at its elevated temperature to inactivate the enzyme. The holding at the elevated temperature to inactivate the enzyme is commonly known as "boil off," and there is a considerable viscosity change from the time that boil off is started until it is completed. It is believed that during the boil off, some unswollen starch particles, previously unbroken, are broken down by the heat required for the boil off. With a chemical deactivation of the enzyme, without a prior boil off step, it is believed that some of the unswollen particles continue to break down when the starch is stored at elevated temperatures, resulting in a product with an inadequate viscosity stability. While the boil off step is thus desirable to physically disrupt unbroken particles and to produce a more homogeneous converted starch product, a conversion process consisting only of an enzyme conversion step followed by a heat deactivation of the enzyme has the disadvantages that reproducible results and target viscosities are very difficult to obtain due to the complexity of reactions and changes that take place during boil off. However, we have found that once the starch has been subjected to a boil off step after a partial enzyme conversion, a second enzyme conversion step followed by a chemical deactivation of the enzyme can be utilized to produce starch products having target viscosities, which have the surprising and unexpected viscosity stability to allow for storage of the starch at elevated temperatures for considerable periods of time before use.

In general, the following is an illustration of the operation of the improved process of this invention. Into a closed type of vessel, starch, water, and enzyme are introduced. The pH is adjusted to between 6.4 and 7.1 with any suitable material before the enzyme is introduced. The mixture is heated to between 165° and 180° F., preferably 165° to 170° F., and held for about 15 minutes. The mixture is then brought to a boil off temperature between 205° and 212° F. and held for between 15 and 30 minutes. Periods of from 5 to 32 minutes have been utilized in raising the temperatures to boil off, with a preferred range of from 5 to 15 minutes, but longer or shorter times can be used. During the boil off stage, the enzyme is deactivated, and previously unbroken starch particles are disaggregated or degraded. The starch mixture is then cooled to some specific temperature between 165° and 180° F. in a minimum amount of time (5 to 15 minutes), after which the viscosity of the mixture is measured. At this point, a second enzyme addition is made, the amount of enzyme added being a function of both the viscosity measured and the desired final viscosity. After this ceond enzyme addition, the starch mixture is held at the specified temperature between 165°–180° F. for sufficient time to yield a product with the desired final viscosity. A chemical deactivator is then added to arrest the enzyme and to prevent further reductions in viscosity.

The time allowed for the second conversion may be varied in proportion with the amount of enzyme used, i.e., $[E] \times t = k$, the product of the enzyme concentration and the conversion time equals a constant. In the present process, conversion times of from 7½ to 30 minutes have been utilized, with a preferable range of from 15 to 30 minutes.

The converted starch, after arrest of the enzyme, is stored or used immediately in paper sizings and coatings, depending upon the starch demand.

The enzyme which has been employed in the process of this invention is alpha amylase. The enzyme must have heat stability up to temperatures of about 180° F.

It has been found that starch dispersions which are utilized in paper coatings generally have a viscosity, as measured by Brookfield at 20 r.p.m., below 200 cps.

Throughout this specification, final viscosities of around 100 cps. will be disclosed, but it is to be understood that this is only for purposes of illustration, and final viscosities may be obtained which are much higher or lower.

After the boil off, if the viscosity of the starch when cooled to between 165° and 180° F. is 300 cps. or less, the final viscosity of the starch slurry can be accurately anticipated by our process. As will be shown, an amount of enzyme based on the viscosity of the starch when cooled after boil off to between 165° and 180° F. will be added for the second conversion to yield a starch slurry with a final viscosity of about 100 cps. Similar calculations can be made for starch slurries with higher or lower final viscosities.

In the drawing forming part of this specification,

*Example 1*

Figure 1:
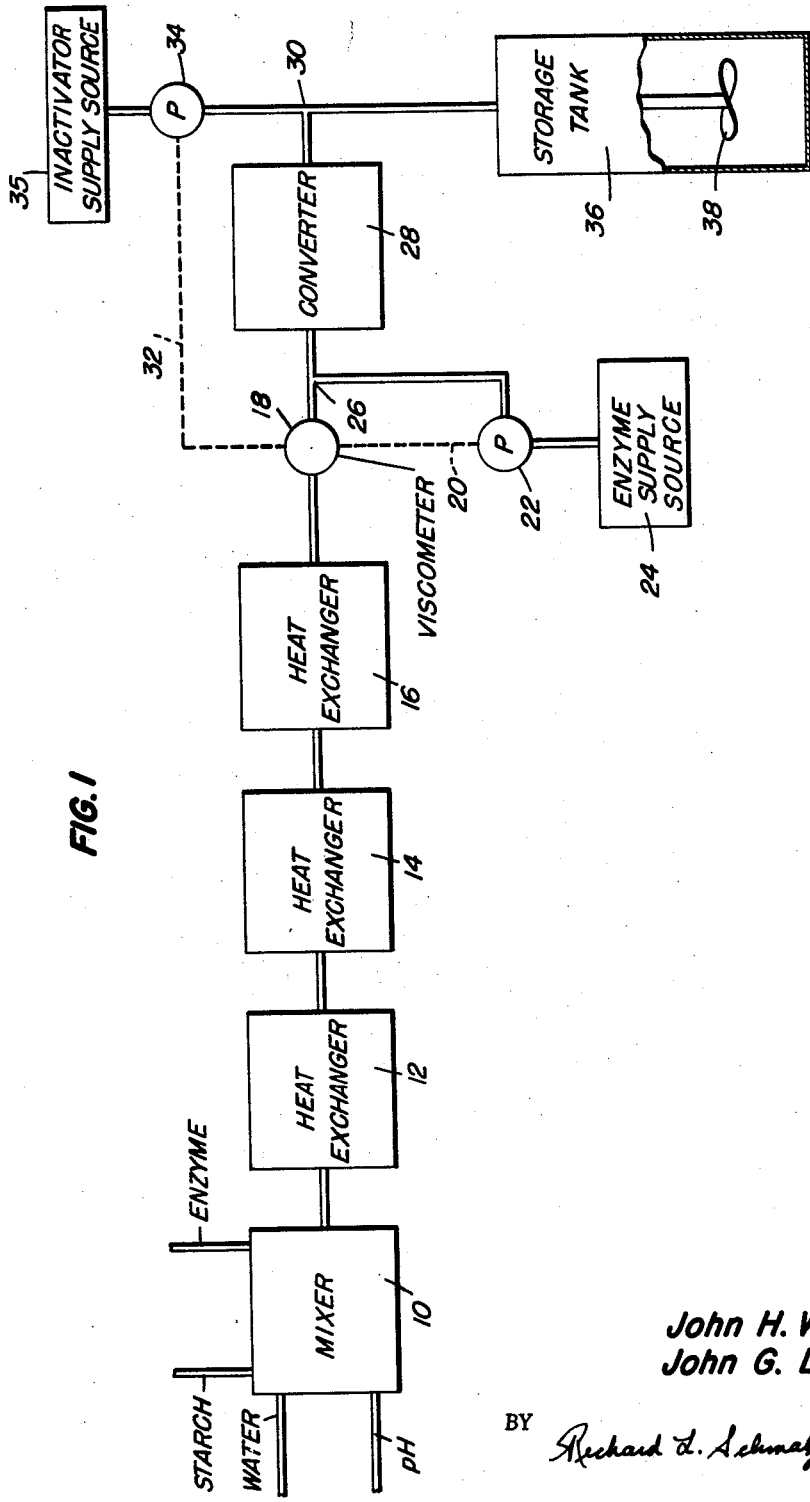
FIGURE 1 is a flow diagram of the process of this invention.

Sufficient amounts of corn starch and water were introduced into the mixer 10 and mixed to provide a 30% starch slurry. The pH was adjusted to 6.8 by adding sodium carbonate. Alpha amylase solution was also added to the mixer in sufficient quantities to provide a starch viscosity of about 2000 cps. or less after the first conversion step and before boil off. In this instance, enzyme was added to the mixer 10 as a 1% solution at a rate of .0201% dry enzyme based on the weight of dry starch. The starch slurry, containing enzyme, then passed into heat exchanger 12 and was held at a temperature of 165° F. where it was dispersed and partially converted. The duration of exposure of the starch slurry at this temperature was about 15 minutes. The viscosity of the starch after this treatment was about 2000 cps. The partially converted starch was then introduced into heat exchanger 14, where the temperature of the starch was raised to 205° F. This was brought about by gradually raising the temperature of the starch from 165° to 205° F. over a period of about 13 minutes, and then the starch was exposed to the elevated temperature for an additional 15 minutes in heat exchanger 14 so that the starch temperature approached 212° F. The starch then was passed into heat exchanger 16 and cooled to a temperature of 170° F. in a minimum amount of time, which in this instance was about 12 minutes. The viscosity of the starch was then measured by an automatic viscometer 18. The viscosity of the partially converted starch at this point was 170 cps. A control system indicated generally by dotted lines 20 is provided between the viscometer 18 and the metering pump 22. Based on the viscosity measured by the viscometer 18, a quantity of a 1% enzyme solution was metered from the enzyme supply source 24 by metering pump 22 into the flowing stream of starch at point 26. The starch and enzyme then passed into converter 28 and were held at a temperature of 170° F. for about 30 minutes. The viscosity of the converted starch at this point was 82 cps. After this second conversion stage, enzyme deactivator, which is this instance was copper sulfate, CuSO$_4$, was metered from inactivator supply source 35 and introduced into the starch slurry at point 30. A control system indicated generally by dotted lines 32 is provided between the viscometer 18 and the metering pump 34. A quantity of copper sulfate, based on the amount of enzyme added at point 26 was introduced as a 20% solution. In this instance, the copper sulfate was added at a rate of 5000% copper sulfate based on the weight of enzyme added at point 26. Immediately after the copper sulfate addition, the viscosity was found to be 86 cps. The converted starch was delivered to storage tank 36 equipped with stirrer 38 and held at 170° F., and six hours and 33 minutes after the copper sulfate was added the starch viscosity was 90 cps.

Figure 2:
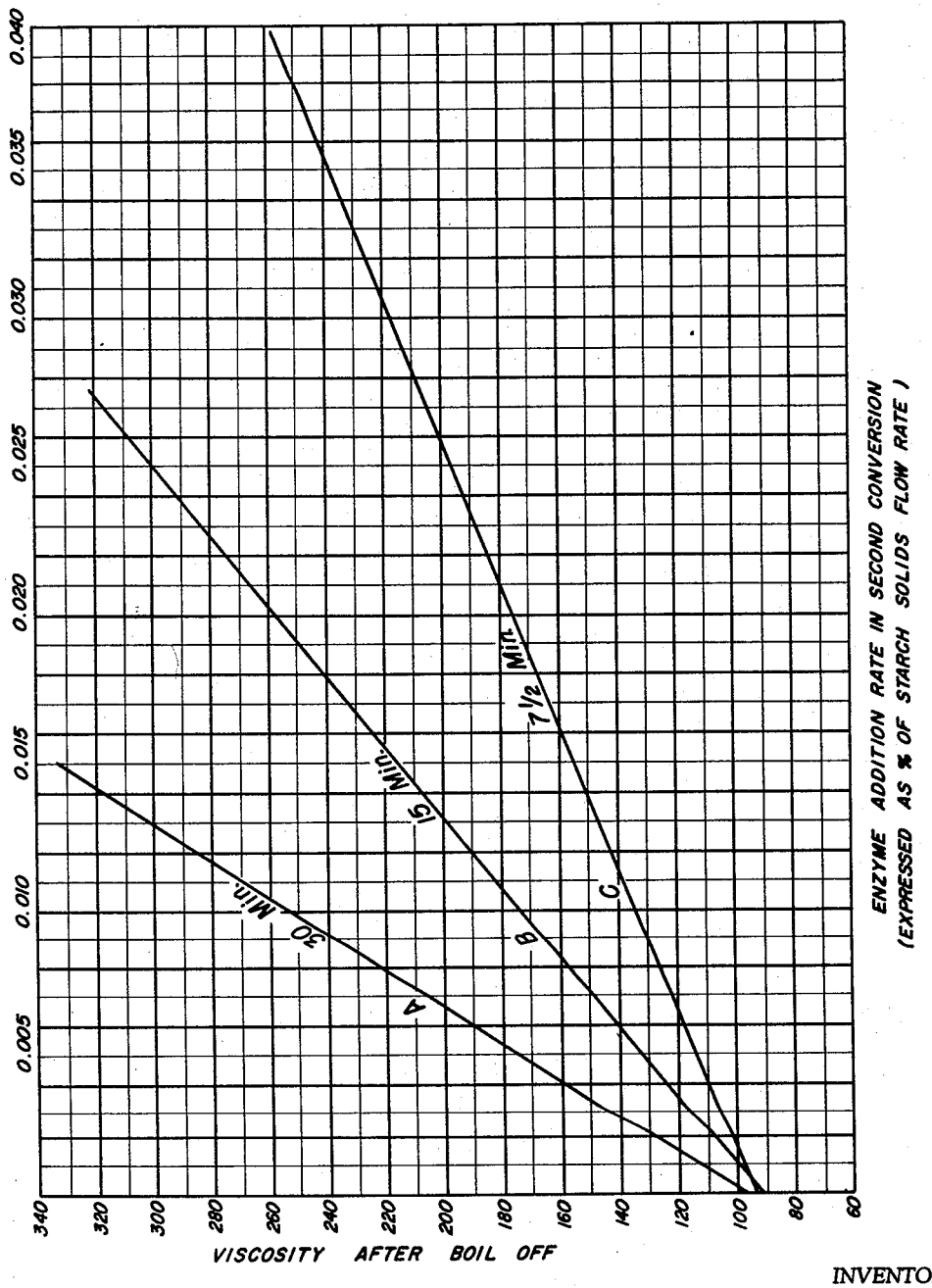
FIGURE 2 is a graph of the relationship of the enzyme requirements for the second conversion and the viscosity of the starch after the first conversion, when producing a starch product with a final viscosity of 80–100 centipoises (Brookfield, 20 r.p.m., 170° F.).

From FIGURE 2, graph A, it can be seen that enzyme was added at point 26 at a rate of .0046% dry enzyme based on the weight of dry starch. Graph A is indicative of the enzyme requirements for a 30 minute second conversion step.

*Example 2*

The process as described in Example 1 was repeated except that alpha amylase was added to mixer 10 at a rate of .0248% dry enzyme based on the weight of dry starch, and the time required to raise the temperature after the first conversion from 165° to 205° F. was shortened to about 5½ minutes. In this instance, hydrogen peroxide was employed as the enzyme deactivator introduced into the converted starch dispersion after the second conversion at point 30. The hydrogen peroxide was added as a 30% solution, and was added at a rate of 6100% H$_2$O$_2$ based on the weight of enzyme added at point 26. The viscosity of the starch when cooled to 170° F. after the boil off was 236 cps. The viscosity after the second conversion was 82 cps. One minute after the addition of hydrogen peroxide, the viscosity was 80 cps., and six hours after the addition of hydrogen peroxide, the viscosity was 82 cps., all of the viscosities mentioned having been measured at 170° F.

The use of hydrogen peroxide as an enzyme deactivator has been found to be preferred over copper sulfate when the converted starch is to be used in paper coating compositions, since hydrogen peroxide adds no electrolyte to the converted starch which might affect the viscosity of subsequently prepared coating compositions, and neither does it impart color to the starch dispersion or coating color. A rate of 5000% H$_2$O$_2$ based on the weight of dry enzyme added at point 26 has been found to be effective in most instances, and rates up to about 9000% H$_2$O$_2$ based on the weight of dry enzyme added at point 26 have been employed.

*Example 3*

The process as described in Example 2 was repeated except that the alpha amylase was added to mixer 10 at a rate of .0166% dry enzyme based on the weight of dry starch, and the boil off period was extended from 15 to 30 minutes to insure homogeneity of the starch dispersion. The viscosity of the starch when cooled to 170° F. after the boil off was 270 cps. From graph A, FIGURE 2, it can be seen that enzyme was added at point 26 prior to the second conversion at a rate of about .0107% dry enzyme based on the weight of dry starch. Hydrogen peroxide was employed as the enzyme deactivator, and was added as a 30% solution at point 30, after the second conversion at a rate of 5070% H$_2$O$_2$ based on the weight of dry enzyme added at point 26. The viscosity of the starch after the second conversion was 90 cps. at 170° F., and the viscosity 5 hours and 39 minutes after the peroxide addition was 88 cps. at 170° F.

*Example 4*

The process of Example 1 was repeated, but in this instance the alpha amylase was added to mixer 10 at a rate of .0194% dry enzyme based on the weight of starch, and the time of the second conversion was reduced from 30 to 15 minutes. It is apparent that from the relationship of $[E] \times t = k$, twice as much enzyme had to be added at point 26 in order to obtain a final viscosity in the desired range of 80 to 100 cps. Graph B, FIGURE 2, is indicative of the enzyme requirements for a 15 minute second conversion step.

In this example, the viscosity of the starch when cooled to 170° F. after the boil off was 190 cps. From graph B, it can be seen that enzyme was added at point 26 at a rate of .0118% dry enzyme based on the weight of dry starch. After the second conversion, the viscosity was 82 cps. at 170° F. The viscosity increased to 90 cps. upon addition of the copper sulfate inactivator, and after six hours and forty-two minutes, the viscosity remained at 90 cps. at 170° F.

*Example 5*

Example 1 was repeated, but the time for the second conversion was reduced to 7½ minutes. Graph C, FIGURE 2, is indicative of the enzyme requirements for a 7½ minute second conversion step.

In this example, the viscosity of the starch when cooled to 170° F. after the boil off was 150 cps. From graph C, it can be seen that enzyme was added at point 26 at a rate of .0138% dry enzyme based on the weight of dry starch. After the second conversion, the viscosity was 90 cps. at 170° F. Upon addition of copper sulfate inactivator, the viscosity remained at 90 cps., and after six hours and forty-four minutes, the viscosity was still 90 cps., at 170° F.

The automatic viscometer 18 utilized in the process of this invention is conventional equipment, and is preferably a Norcross Enzometer, although other automatic viscometers may be used. The Norcross Enzometer is described in Bulletin No. V-1221 of the Norcross Corporation, Newton, Massachusetts.

Throughout all the above examples, the viscosity of the starch dispersion after the boil off and subsequent cooling to 170° F. was 300 cps. or less. It has been found that when the viscosity at this point in the process is 300 cps. or less at a temperature between 165° and 180° F., the amount of enzyme necessary in the second conversion to further reduce the viscosity to a target value can be accurately determined. In all of the examples, this target value was a range between 80–100 cps., at a temperature of 170° F. It has been found that this range provides a starch product suitable for use in the particular type of paper coatings into which the starch was later incorporated. It is to be noted however that other viscosity ranges and values can be obtained and are within the contemplation of this invention. The particular range chosen for purposes of this specification is by way of illustration, and is not to be considered a limitation on the herein disclosed invention.

It has been preferred to provide 30% starch slurries in mixer 10, since 30% starch seems to be an optimum ratio of starch to water. It is desired to use as much starch as possible in order to maintain a high efficiency in the conversion process, but it is recognized that slurries of higher starch proportions become increasingly harder to handle.

All of the converted starch products set forth in the above examples were capable of being stored at 170° F. for a surprisingly extended period of six hours or more with a viscosity stability of ±10 cps.

The enzymes which have been used have good heat stability in the temperature range contemplated by this invention. Any alpha amylase, with heat stability up to temperatures of about 180° F., may be employed.

It is to be noted that in the converting operations of this invention, the amount of enzyme used, the activity of the enzyme, the conversion times, the flow rates of starch, enzyme, and water, and the temperatures employed are inter-related variables; and a change in one variable may be compensated for by a change in others. We have preferentially chosen to supply an amount of enzyme for the first conversion to yield a product with a Brookfield viscosity at 20 r.p.m. of about 2000 cps. at 170° F., and to vary only the enzyme addition for the second conversion as required because rigid control could be maintained at this point in the process. However, if a change in the enzyme added at point 26 is not sufficient to bring about the desired result with respect to final starch viscosity, then the amount of enzyme employed in the first step may be varied.

While copper sulfate and hydrogen peroxide have been disclosed as enzyme deactivators used after the second conversion step, many other chemicals may also be used, such as trichloroacetic acid, silver nitrate, mercuric chloride, picric acid, potassium iodide, and tannic acid.

Various changes may be made in the steps specifically set forth without departing from the spirit of our invention or the scope of the appended claims.

We claim:
1. A continuous process of converting starch which comprises the steps of:
    (a) heating a mixture of starch, water, and alpha amylase to conversion temperature,
    (b) holding the mixture at the conversion temperature to allow the alpha amylase to effect a major viscosity reduction in the starch mixture,
    (c) rapidly raising the temperature of the starch mixture to an elevated temperature sufficiently above the conversion temperature and holding the mixture at said elevated temperature to inactivate the alpha amylase and to effect a further reduction in the viscosity of the starch mixture,
    (d) cooling the mixture to conversion temperature,
    (e) continuously measuring the viscosity of the mixture at the conversion temperature,
    (f) adding to the mixture fresh alpha amylase at a rate based on said measured viscosity and on the desired final viscosity,
    (g) holding the mixture at conversion temperature to allow the alpha amylase to further degrade the starch to the desired final viscosity,
    (h) and adding a chemical deactivator to the mixture at a rate based on the fresh alpha amylase addition of step (f) above to inactivate the alpha amylase.
2. A continuous process of converting starch which comprises the steps of:
    (a) mixing together starch, water, and a first alpha amylase addition,
    (b) heating the mixture to conversion temperature of the starch,
    (c) holding the mixture at the conversion temperature to allow the alpha amylase to partially degrade the starch to yield a starch mixture with a Brookfield viscosity at 20 r.p.m. of less than 2000 centipoises at conversion temperature,
    (d) rapidly raising the temperature of the starch mixture to at least 205° F. to inactivate the alpha amylase and to effect a further reduction in the viscosity of the starch mixture,
    (e) cooling the mixture to conversion temperature,
    (f) continuously measuring the viscosity of the starch mixture at the conversion temperature,
    (g) adding to the mixture a second alpha amylase addition at a rate based on said measured viscosity and on the desired final viscosity,
    (h) holding the mixture at conversion temperature to allow the alpha amylase to further degrade the starch to the desired final viscosity,
    (i) and adding a chemical deactivator to the mixture at a rate based on the second alpha amylase addition to inactivate the alpha amylase.
3. A continuous process of converting starch which comprises the steps of:
    (a) introducing into a closed vessel starch and water and mixing to provide about a 30% starch mixture,
    (b) introducing into the closed vessel a first addition of alpha amylase in a sufficient amount to provide a Brookfield viscosity at 20 r.p.m. of less than 2000 centipoises after step (d) below,
    (c) passing the starch mixture to a heating zone and heating said mixture to a temperature between 165° and 180° F.,
    (d) holding the starch mixture at said temperature for approximately 15 minutes,
    (e) passing the starch mixture to a second heating zone and raising the temperature of the starch mixture to between 205° and 212° F.,

(f) holding the starch mixture at said temperature for between 15 and 30 minutes, (g) then introducing the starch mixture into a cooling zone and cooling said mixture to a temperature between 165° and 180° F., (h) continuously measuring the viscosity of the starch mixture, (i) adding to the starch mixture a second alpha amylase addition at a rate based on said measured viscosity, (j) holding the starch mixture at said temperature between 165° and 180° F. for between about 7½ and 30 minutes, (k) and continuously adding a chemical deactivator to the mixture at a rate based on the second alpha amylase addition to inactivate the alpha amylase.

4. A continuous process of converting starch which comprises the steps of:

(a) introducing into a closed vessel starch and water and mixing to provide about a 30% starch mixture, (b) introducing into the closed vessel a first addition of alpha amylase in a sufficient amount to provide a Brookfield viscosity at 20 r.p.m. of less than 2000 centipoises after step (d) below, (c) passing the starch mixture into a heating zone and heating the mixture to a temperature of about 165° F., (d) holding the starch mixture at said temperature for approximately 15 minutes, (e) passing the starch mixture to a second heating zone and raising the temperature of the mixture to between 205° and 212° F., (f) holding at said temperature for about 15 minutes, (g) then introducing the starch mixture into a cooling zone and cooling the mixture to a temperature of about 170° F., (h) continuously measuring the viscosity of the starch mixture at said temperature, (i) adding to the starch mixture a second addition of alpha amylase at a rate based on said measured viscosity, (j) holding the starch mixture at 170° F. for about 15 minutes, (k) and then continuously adding a chemical deactivator to the starch mixture at a rate based on the second alpha amylase addition to inactivate the alpha amylase.

5. The continuous process of claim 3 in which the pH of the starch mixture is adjusted to between 6.4 and 7.1 before the first alpha amylase addition of step (b).

6. The continuous process of claim 3 in which the chemical deactivator in step (k) is selected from the group consisting of copper sulfate and hydrogen peroxide.

7. The continuous process of claim 3 in which the chemical deactivator in step (k) is selected from the group consisting of copper sulfate and hydrogen peroxide and is added in step (k) at a rate to provide at least about 5000% deactivator based on the weight of dry alpha amylase added in step (i).

8. In a continuous process of converting starch to provide starch dispersions with final Brookfield viscosities at 20 r.p.m. in the range of 80 to 100 centipoises at 170° F., the steps of:

(a) introducing into a closed vessel starch and water and mixing to provide about a 30% starch mixture, (b) introducing into the closed vessel a first addition of alpha amylase in a sufficient amount to provide a Brookfield viscosity at 20 r.p.m. of less than 2000 centipoises after step (d) below, (c) passing the starch mixture to a heating zone and heating said mixture to a temperature between 165° and 180° F., (d) holding the starch mixture at said temperature for approximately 15 minutes, (e) passing the starch mixture to a second heating zone and raising the temperature of the starch mixture to at least about 205° F., (f) holding the starch mixture at said temperature to arrest the alpha amylase and to provide a Brookfield viscosity at 20 r.p.m. of less than 300 centipoises after step (g) below, (g) then introducing the starch mixture into a cooling zone and cooling said mixture to a temperature between 165° and 180° F., (h) continuously measuring the viscosity of the starch mixture, (i) adding to the starch mixture a second alpha amylase addition at a rate based on said measured viscosity, (j) holding the starch mixture at said temperature between 165° and 180° F. for between about 7½ and 30 minutes, (k) and continuously adding a chemical deactivator to the mixture at a rate based on the second alpha amylase addition to inactivate the alpha amylase.

9. In a continuous process of converting starch to provide starch dispersions with final Brookfield viscosities at 20 r.p.m. in the range of 80 to 100 centipoises at 170° F., the steps of:

(a) introducing into a closed vessel starch and water and mixing to provide about a 30% starch mixture, (b) introducing into the closed vessel a first addition of alpha amylase in a sufficient amount to provide a Brookfield viscosity at 20 r.p.m. of less than 2000 centipoises after step (d) below, (c) passing the starch mixture into a heating zone and heating the mixture to a temperature of about 165° F., (d) holding the starch mixture at said temperature for approximately 15 minutes, (e) passing the starch mixture to a second heating zone and raising the temperature of the mixture to between 205° and 212° F., (f) holding at said temperature to arrest the alpha amylase and to provide a Brookfield viscosity at 20 r.p.m. of less than 300 centipoises after step (g) below, (g) then introducing the starch mixture into a cooling zone and cooling the mixture to a temperature of about 170° F., (h) continuously measuring the viscosity of the starch mixture at said temperature, (i) adding to the starch mixture a second addition of alpha amylase at a rate based on said measured viscosity, (j) holding the starch mixture at about 170° F. for about 15 minutes, (k) and then continuously adding a chemical deactivator to the starch mixture at a rate based on the second alpha amylase addition to inactivate the alpha amylase.

10. The continuous process of claim 8 in which the pH of the starch mixture is adjusted to between 6.4 and 7.1 before the first alpha amylase addition of step (b).

11. The continuous process of claim 8 in which the chemical deactivator in step (k) is selected from the group consisting of copper sulfate and hydrogen peroxide.

12. The continuous process of claim 8 in which the chemical deactivator in step (k) is selected from the group consisting of copper sulfate and hydrogen peroxide and is added in step (k) at a rate to provide at least about 5000% deactivator based on the weight of dry alpha amylase added in step (i).

References Cited in the file of this patent

UNITED STATES PATENTS

| | | |
|---|---|---|
| 2,647,854 | Pfannmuller | Aug. 4, 1953 |
| 2,967,804 | Kerr | Jan. 10, 1961 |